United States Patent

Brock et al.

[11] Patent Number: 5,870,216
[45] Date of Patent: Feb. 9, 1999

[54] SPLITTERLESS OPTICAL BROADCAST SWITCH

[75] Inventors: John C. Brock, Redondo Beach; Lawrence J. Lembo, Torrance; David L. Rollins, Hawthorne, all of Calif.

[73] Assignee: TRW Inc., Redondo Beach, Calif.

[21] Appl. No.: 826,957

[22] Filed: Apr. 9, 1997

Related U.S. Application Data

[63] Continuation-in-part of Ser. No. 548,535, Oct. 26, 1995, Pat. No. 5,661,582.

[51] Int. Cl.$^6$ ..................................................... H04B 10/00
[52] U.S. Cl. ............................ 359/172; 359/117; 359/128
[58] Field of Search .................................... 359/172, 133, 359/130, 128, 117; 455/12.1

[56] References Cited

U.S. PATENT DOCUMENTS

| | | | |
|---|---|---|---|
| 5,173,794 | 12/1992 | Cheung et al. | 359/127 |
| 5,402,259 | 3/1995 | Lembo et al. | 359/245 |
| 5,424,862 | 6/1995 | Glynn | 359/172 |
| 5,475,520 | 12/1995 | Wissinger | 359/172 |

FOREIGN PATENT DOCUMENTS 2 267 006  11/1993  United Kingdom.

Primary Examiner—Kinfe-Michael Negash
Attorney, Agent, or Firm—Michael S. Yatsko

[57] ABSTRACT

A splitterless optical broadcast switch (110) for routing a plurality of optical carrier signals. The splitterless optical broadcast switch (110) includes an optical source (112) for generating a plurality of unmodulated optical carrier signals. A first stage routing module (114) routes the plurality of unmodulated optical carrier signals. A modulating module (116) receives a plurality of RF input signals and modulates each of the RF input signals onto any number of the unmodulated optical carrier signals to generate a plurality of modulated optical carrier signals. A second stage routing module (118) routes the plurality of modulated optical carrier signals complimentary to the first stage routing module (114). An output module (120) receives the plurality of modulated optical carrier signals such that the optical output from the optical source (112) is paired to a complimentary optical input of the output module (120).

21 Claims, 14 Drawing Sheets

Configuration Requirements for 16 RF Inputs 64 RF Outputs
(Assume 2nm Wavelength Spacing)

|  | Fig. 7 | Fig. 9 | Fig. 11 |
|---|---|---|---|
| # Modulators (M) | 16 | 16 | 16 |
| # Detectors (N) | 64 | 64 | 64 |
| # Lasers (N) | 64 | 64 | 64 |
| # Wavelength/Laser | 16 | 1 | 4 |
| Laser Wavelength Range Required | 30nm | N/A | 6nm |
| # 1:K Switches | 0 | 64 | 64 |
| # K:1 Switches | 0 | 64 | 64 |
| K=M/J, M Fig. 9 Fig. 11 | N/A | 16 | 4 |
| #AWGs or WDMs | 2(AWGs) | 32(WDMs) | 8(AWGs) |
| I/O Port Configuration for AWGs/WDMs | 64x16–1st stage 16x64–2nd stage | 64x1–1st stage 1x64–2nd stage | 64x4–1st stage 4x64–2nd stage |

FIG. 13

SPLITTERLESS OPTICAL BROADCAST SWITCH

CROSS-REFERENCE TO RELATED APPLICATION

This application is a continuation in part application of commonly assigned U.S. Ser. No. 08/548,535, entitled "Photonic Interconnect And Photonic Processing For Communication and Data Handling Satellites" by Mark Kintis, Scott Kichizo Isara, John Conarroe Brock, Lawrence Ray Tittle and Peter Regent Pawlowski, filed on Oct. 26, 1995, now U.S. Pat. No. 5,661,582.

BACKGROUND OF THE INVENTION

1. Field of the Invention

This invention relates generally to optical broadcast switches and, more particularly, to a splitterless optical broadcast switch for communication and data handling satellites.

2. Discussion of the Related Art

The exploding demand for global wireless communications, data gathering and signal processing is currently placing unprecedented requirements on the capabilities of communication and data handling satellites. These satellites include single platform communication systems which operate independently from other systems, multi-platform communication systems which employ many cross-linked satellites, and data handling systems which sense and monitor various parameters. This demand is dramatically increasing signal traffic which is leading to saturation of existing RF bands that have been allocated for the various communication functions. Such saturation is increasing the need to utilize new frequency bands at much higher frequencies.

As a result, future communication and data handling satellites will be required to process very wide bandwidths comprised of densely populated signals. Moreover, these satellites will need to provide frequency conversion capabilities to route signals through different allocated bands assigned by different international regulatory agencies. However, the use of current satellite RF signal interconnects and distribution systems have several disadvantages.

For example, existing communication and data handling satellites are limited by the characteristics of RF coaxial cables. In other words, signals received and transmitted by the satellites, via its antenna, are interconnected and distributed throughout the satellite on coaxial cables. Coaxial cables are inherently large, bulky and heavy transmission mediums. Moreover, coaxial cables are designed to operate in a specific frequency band and are thus substantially band limited. Still further, coaxial cables tend to exhibit very high losses as the frequency increases.

The above-identified disadvantages associated with the use of coaxial cables is further amplified by its use in satellites. Specifically, the losses exhibited with coaxial cables require the satellite to have additional amplifiers which requires larger power supplies, which in turn requires more solar panels to supply the energy to the system. The weight and size of the satellite is also significantly increased because of these losses, as well as because of the size and weight of the coaxial cables. This increase in weight and size also ultimately increases launch costs of the satellite. Still further, since coaxial cables are bandwidth limited, a greater number of coaxial cables are required to handle various frequency bands the satellite may operate at. This causes the satellite to be less versatile at handling multiple frequency bands.

A photonic interconnect and photonic processing apparatus for communication and data handling satellites reduces or eliminates the above mentioned disadvantages. This in turn, increases bandwidth capabilities; increases versatility; decreases weight and size of the satellite; decreases power consumption; decreases launch costs; and decreases the overall cost of communication and data handling satellites. While the photonic interconnect and photonic processing apparatus for communication and data handling satellites is an improvement over existing prior art systems, the optical switching employed by the photonic interconnect photonic processing system may also be further improved upon.

For example, many M input×N output optical broadcast switches employ power splitters to obtain broadcast capability. Use of such power splitters creates optical split loss which may become a problem when high dynamic range or a low noise floor is required. To overcome the losses incurred by the use of optical power splitters, optical amplifiers can be employed. However, these optical amplifiers generally require extremely high optical saturation power levels when placed before split losses to maintain high dynamic range. For satellite applications where DC power consumption is important, this approach may be undesirable due to its potential inefficient use of optical power and associated DC power. Moreover, introduction of the optical amplifiers further introduces additional noise into the system thereby further raising the noise floor. Such M×N optical broadcast switches must also generate enough optical power to support MN outputs, even though only N of the signals are actually used. This situation arises because a laser source in a photonic network is generally paired or coupled directly to a particular optical modulator and RF input irrespective of the network switching configuration.

What is needed then is a splitterless optical broadcast switch for communication and data handling satellites, as well as for terrestrial based applications, which eliminates the use of power splitters to obtain broadcast capability. This will, in turn, further decrease the weight and size of the satellite; further decrease power consumption and need; further decrease launch costs; reduce overall noise within the system; and pair each laser source with a photodetector instead of with an optical modulator and the RF input. It is, therefore, an object of the present invention to provide such a splitterless optical broadcast switch.

SUMMARY OF THE INVENTION

In accordance with the teachings of the present invention, a splitterless optical broadcast switch for routing a plurality of optical carriers is disclosed. The splitterless optical broadcast switch routes a plurality of optical carrier signals without the use of power splitters, thereby substantially reducing the overall power requirements of the splitterless optical broadcast switch, and eliminating the need for optical amplifiers. The splitterless broadcast switch may be employed with any communication and data handling satellite or alternatively with any terrestrial based applications.

In one preferred embodiment, an optical source generates a plurality of unmodulated optical carriers. A first stage routing module directs the plurality of unmodulated optical carriers to a set of modulators in a manner determined by the wavelengths of the optical carriers. Each modulator also receives an RF input signal which is modulated onto all optical carriers that have been routed to that modulator. A second stage routing module routes the plurality of modulated optical carrier signals complimentary to the first stage routing module. An output module receives the plurality of modulated optical carrier signals such that each optical output from the optical source is paired with a complimentary optical input of said output module.

Use of the present invention provides a splitterless optical broadcast switch for routing a plurality of optical carrier signals. As a result, the aforementioned disadvantages associated with current broadcast switches have been substantially reduced or eliminated.

BRIEF DESCRIPTION OF THE DRAWINGS

Still other advantages of the present invention will become apparent to those skilled in the art after reading the following specification and by reference to the drawings in which:

FIG. 13 is a chart setting forth the configuration requirements for a 16×64 system for each embodiment of the splitterless optical broadcast switch set forth in FIGS. 7, 9 and 11.

DETAILED DESCRIPTION OF THE PREFERRED EMBODIMENT(S)

The following description of the preferred embodiments concerning a splitterless optical broadcast switch for communication and data handling satellites are merely exemplary in nature and are in no way intended to limit the invention or its application or uses. Moreover, while the splitterless optical broadcast switch is discussed in detail below in connection with a communication and data handling satellite, the splitterless optical broadcast switch may be used with various other systems including terrestrial based systems.

Figure 1:
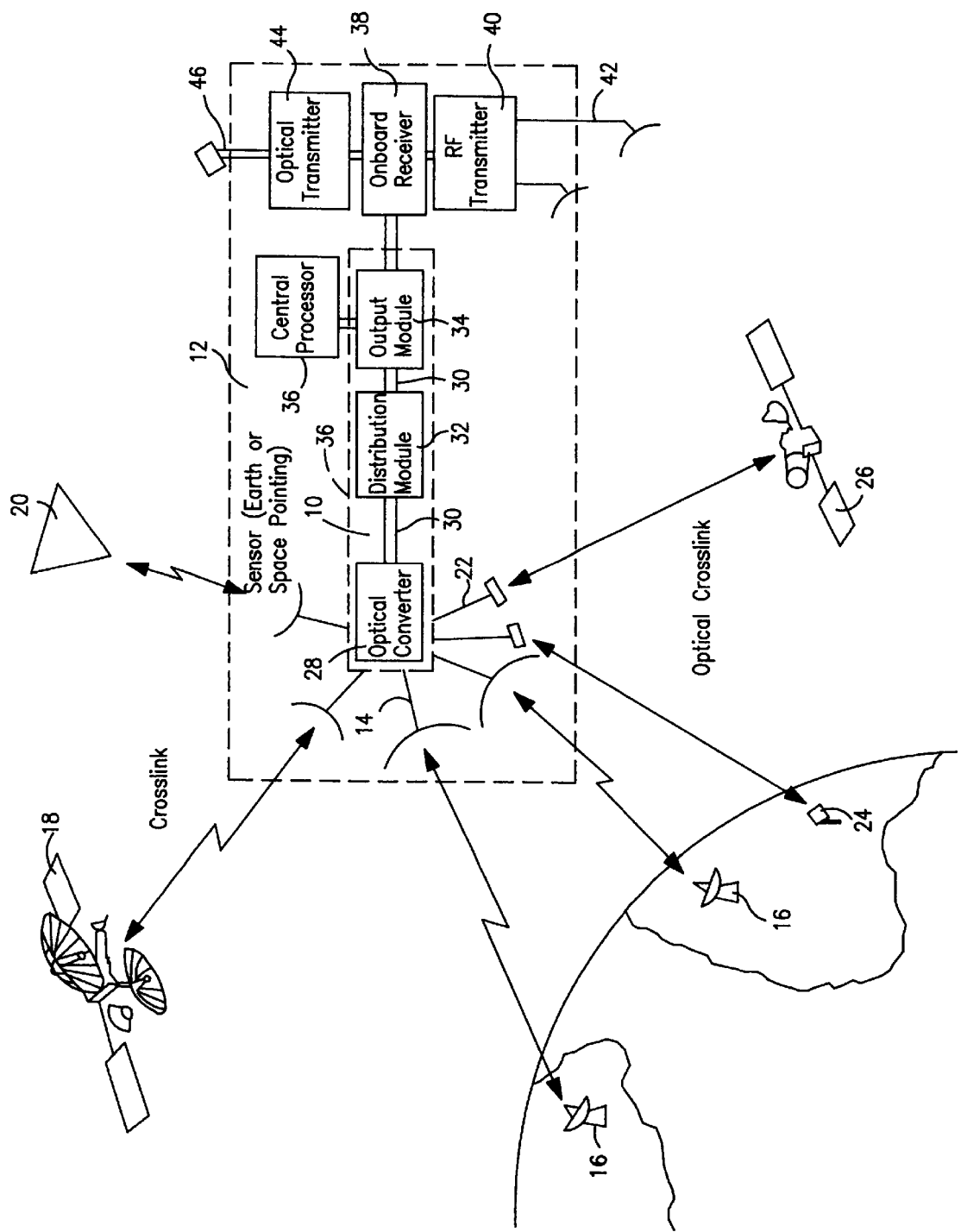
FIG. 1 is an overall system block diagram of an embodiment of the present invention.

Referring to FIG. 1, a photonic interconnect and photonic processing apparatus 10 is shown in a system environment. The photonic interconnect and photonic processing apparatus 10 is incorporated into a communication and data handling satellite 12 and is used for satellite onboard distribution, switching/routing, processing and frequency conversion, which will be described in detail hereinafter. The photonic interconnect and photonic processing apparatus 10 is used in communication repeater and direct broadcast satellite systems that receive and transmit signals on RF carriers, optical carriers or a combination of both. The photonic interconnect and photonic processing apparatus 10 is also used in connection with remote sensors or sensing satellites that initiate data generation or perform data handling.

The photonic interconnect and photonic processing apparatus 10 includes multiple RF antennas 14 such as phased array antennas, multibeam antennas, or conventional RF antennas which are used to receive multiple RF signals. However, one skilled in the art would also appreciate that a single RF antenna 14, such as a phased array antenna, could also be utilized to receive multiple RF signals in different antenna beam patterns produced by the single antenna 14. The RF signals received by the antennas 14 are transmitted from ground based RF uplinks 16 and/or from crosslink satellites 18. Additional RF signals are transmitted from sensor equipment 20 either positioned in space or on the earth for sensing and monitoring various phenomena. These RF signals operate in various frequency bands across the entire frequency spectrum each having potentially different bandwidths.

Alternatively, the communication and data handling satellite 12 may also receive communications or data signals which have already been encoded on optical carriers such as in laser communications. These direct optical signals are received from free-space optical receiver units 22. The optical signals received by the optical receiver units 22 are transmitted from ground based optical uplinks 24 and/or from optical crosslink satellites 26. The optical receiver units 22 are generally known in the art as telescopes which have a lens that focuses the optical beam generally transmitted by a laser.

The various RF signals received by the antennas 14 are modulated or frequency translated into one or more optical carriers in an optical converter 28 for transmission on lightweight, wide bandwidth input optical fibers 30 which are routed throughout the satellite 12. Alternatively, the various RF signals may be first RF multiplexed at the front end onto a single RF transmission line before being coupled onto a single optical fiber 30. The optical signals received by the optical receiving unit 22 are also passed directly onto the lightweight, wide bandwidth input optical fibers 30 in the optical converter 28. The optical signals on the optical fibers 30 are distributed and/or routed throughout the satellite 12, via a distribution module 32 which is optically coupled to the optical converter 28. From the distribution module 32, the optical signals are applied to and processed in an output module 34 which is optically coupled to the distribution module 32, via output optical fibers 30. From the output module 34, the optical signals and RF signals are applied to a central processor 36, an onboard receiver 38, a RF transmitter 40 for RF transmission, via RF transmit antennas 42 and/or an optical transmitter 44 for optical transmission, via optical transmitting unit 46 consisting of a laser and telescope. The central processor 36 receives RF and/or optical signals for use in the control and operation of the satellite 12. The onboard receiver 38 also receives RF and/or optical signals which may be transmitted, via RF transmitter 40 and/or optical transmitter 44.

Figure 2A:
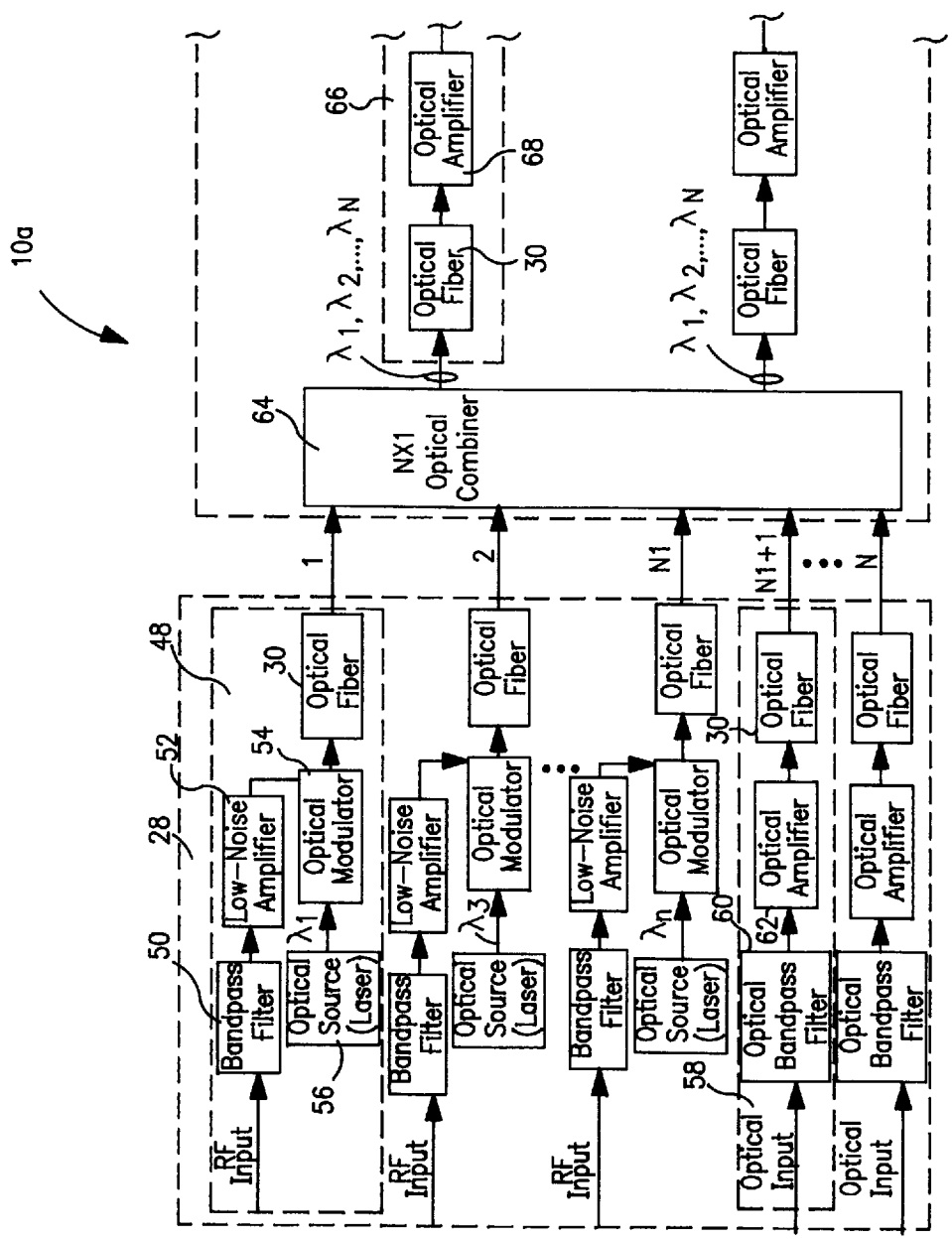
FIG. 2 is a detailed schematic block diagram of one embodiment of the present invention.
Figure 2B:
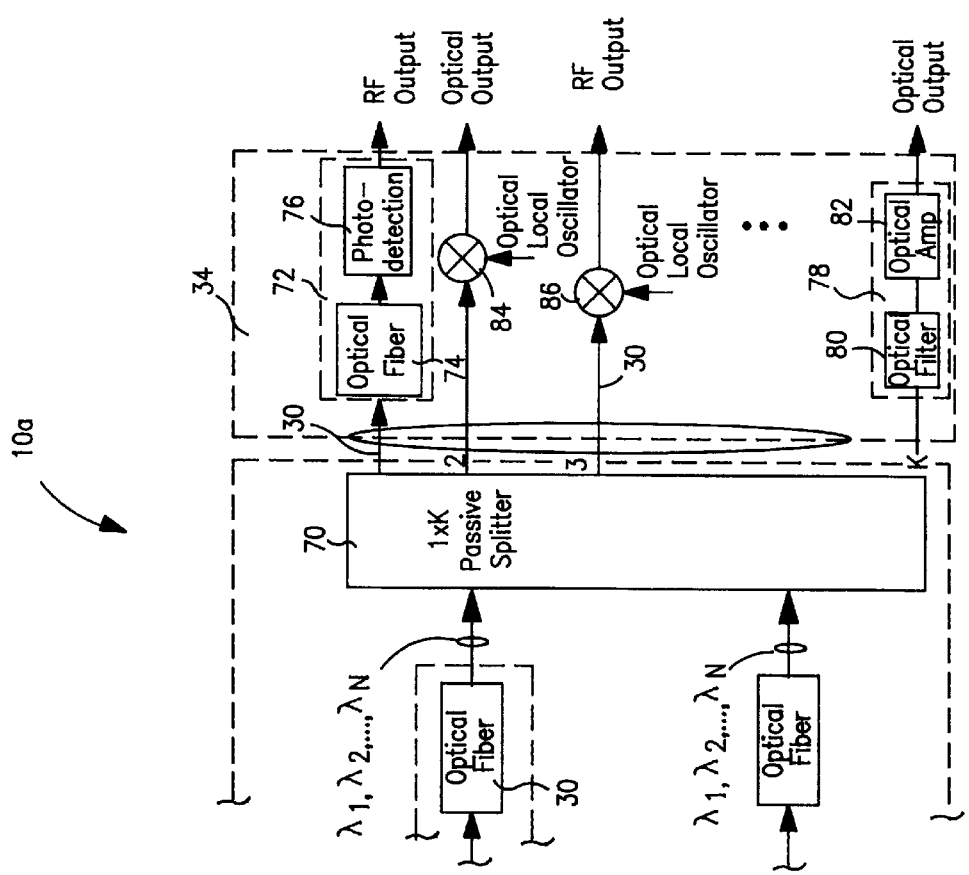

Turning to FIG. 2, a detailed schematic block diagram of a first embodiment of the photonic interconnect and photonic processing apparatus 10a is shown. The photonic interconnect and photonic processing apparatus 10a utilizes a wavelength division multiplex (WDM) format, wherein each optical source has a different optical wavelength carrier which are all applied to a single optical fiber 30 in a summed or multiplexed manner. The photonic interconnect and photonic processing apparatus 10a includes the optical converter 28 optically coupled to the distribution module 32, via input optical fibers 30, which in turn is optically coupled to the output module 34, via output optical fibers optical fibers 30. The optical fibers 30 used with the photonic interconnect and photonic processing apparatus 10a may be multi-mode or single mode fiber optic cables, as appropriate.

The optical converter 28 includes a plurality of RF-to-optical signal paths 48 corresponding to the number of antenna beams or RF antennas 14, or other divisions such as splitting the signal into subbands. Each RF-to-optical signal path 48 includes a bandpass filter 50 used to filter the desired RF input signal and reject the noise received by the antenna 14. The filtered RF signal from the bandpass filter 50 is applied to a low-noise amplifier (LNA) 52 which amplifies the low power RF signal. The low-noise amplifier 52 may consist of a high electron mobility transistor (HEMT) amplifier which uses known MMIC (Monolithic Microwave Integrated Circuit) technology. This type of amplifier provides very high gain with very little noise.

The amplified RF signal from the low-noise amplifier 52 is applied to an optical modulator 54, such as that disclosed in commonly assigned U.S. Pat. No. 5,402,259, which is hereby incorporated by reference. The optical modulator 54 receives a carrier from an optical source such as laser 56 such that the optical modulator 54 takes the RF energy from the amplified RF signal and modulates this onto an optical carrier which is centered at about the wavelength ($\lambda_1$) of the laser 56. From this, the optical modulator 54 generates an optically modulated signal which is coupled to the input optical fiber 30. Since the optical fiber 30 is generally not bandwidth limited, the optical fiber 30 is able to transmit numerous variations of received RF signals which have various operating frequencies and formats. Moreover, since the optical fiber 30 is not bandwidth limited, a single RF-to-optical signal path 48 may be used where the various RF signals are first RF multiplexed and applied to a single RF-to-optical signal path 48 limited only by the modulation bandwidth of the optical modulator 54.

The optical converter 28 also includes multiple optical signal paths 58 generally corresponding to the number of optical receiving units 22. The optical input signal received by the optical receiving unit 22 is applied to an optical bandpass filter 60 which filters the desired optical carrier and rejects optical noise received by the optical receiving unit 22, such as from solar flares. The filtered optical signal from the bandpass filter 60 is amplified in an optical amplifier 62 before being optically coupled to the input optical fiber 30.

Each input optical signal on each input optical fiber 30 has an optical carrier having a unique wavelength (i.e. $\lambda_1$, $\lambda_2$, . . . , $\lambda_n$) which is dictated by the wavelength of the laser 56 or by the received optical signal from the optical receiving unit 22. Each of these optical signals are optically coupled to the distribution module 32, via the input optical fibers 30.

The distribution module 32 includes an (N×1) optical combiner 64 (wavelength division multiplexer) which sums N-input optical signals from the input optical fibers 30 each having the unique optical wavelength carrier to create a single summed optical output signal ($S_{out}$ (t)). Letting $e^{j\omega_k t}$ indicate the optical signal frequency and $I_k(t)$ indicate the optical intensity modulation, the summed optical output signal ($S_{out}$ (t)) of the optical combiner 64 is the summation of the N-input optical signals corresponding to the following equation:

$$S_{OUT}(t) = \Sigma_{k=1}^{N} I_K(t) e^{j\omega_k t}.$$

The summed optical signal ($S_{out}$(t)) from the optical combiner 64 is preferably coupled to a single optical signal path 66 which routes throughout the satellite 12. The optical signal path 66 includes the optical fiber 30, an optical amplifier 68 which amplifies the summed optical signal and another optical fiber 30. To accommodate for any power or dynamic range limitations in the optical amplifier 68, additional optical signal paths 66 may be used to transmit only a sub-set of the N-input optical signals such that the optical combiner 64 will have multiple outputs corresponding to the number of optical signal paths 66. Each of the optical signal paths 66 will transmit a sub-set of the N-input optical signals, wherein the summation of all the optical signal paths 66 will include all the N-input optical signals.

The summed optical signal ($S_{out}$(t)) on the optical signal path 66 is optically coupled to a (1×K) passive splitter 70. The passive splitter 70 power divides the summed optical signal ($S_{out}$(t)) from the signal path 66 which includes all the N-input optical signals and distributes the summed optical signal ($S_{out}$ (t)) to each K-output of the passive splitter 70. The passive splitter 70 may consist of a single input, K-output star coupler which is implemented by connecting one-optical fiber 30 to K-optical fibers 30. However, other conventional passive splitting techniques could also be used, as well as active splitting techniques where the function of passive splitters preceded or followed by optical amplifiers is accomplished by active splitters which incorporate the amplification function. At each K-output, all of the N-input optical signals are thus present in a summed or multiplexed manner. In addition, if multiple optical signal paths 66 are used to carry only a sub-set of the N-input optical signals, the passive splitter 70 first combines all the N-input optical signals before power dividing the summed optical signal ($S_{out}$(t)) to the optical K-outputs so that each N-input optical signal is still present at each K-output.

The optical K-outputs from the passive splitter 70 are optically coupled to the output module 34, via the optical fibers 30. The output module 34 transfers the optical signals along various signal paths for processing the optical K-outputs. A first signal path 72 includes a tunable optical filter 74 which selects one wavelength (i.e. $\lambda_1$, $\lambda_2$, . . . , $\lambda_n$) and rejects the other wavelengths. The selected optical signal from the optical filter 74 is applied to a photodetector 76 which converts the selected optical signal to an RF signal corresponding to its RF input signal. This RF signal may be subsequently applied to the central processor 36, the onboard receiver 38, or the RF transmitter 40.

A second signal path 78 includes a tunable optical filter 80 and an optical amplifier 82. The tunable optical filter 80 selects a desired wavelength (i.e. $\lambda_1$, $\lambda_2$, . . . , $\lambda_n$) and rejects the other wavelengths. The optical amplifier 82 amplifies the optical signal selected due to the losses incurred during the power divide in the passive splitter 70. The resultant amplified optical signal may then be applied to the central processor 36, the onboard receiver 38, or the optical transmitter 44, via optical fibers 30 routed throughout the satellite 12. Additional signal paths include an optical-to-optical mixer 84 which optically mixes the K-output optical signal with an optical local (LO) oscillator signal, thereby generating an optical output signal having a different optical wavelength from the optical input signal. Another signal path includes an optical-to-optical mixer 86 similar to the mixer 84. However, the mixer 86 includes a photo-detection step to convert the optical output signal to an RF output signal. The resultant optical output signal or the RF output signal can then be transmitted by the optical transmitter 44 or the RF transmitter 40.

Figure 3:
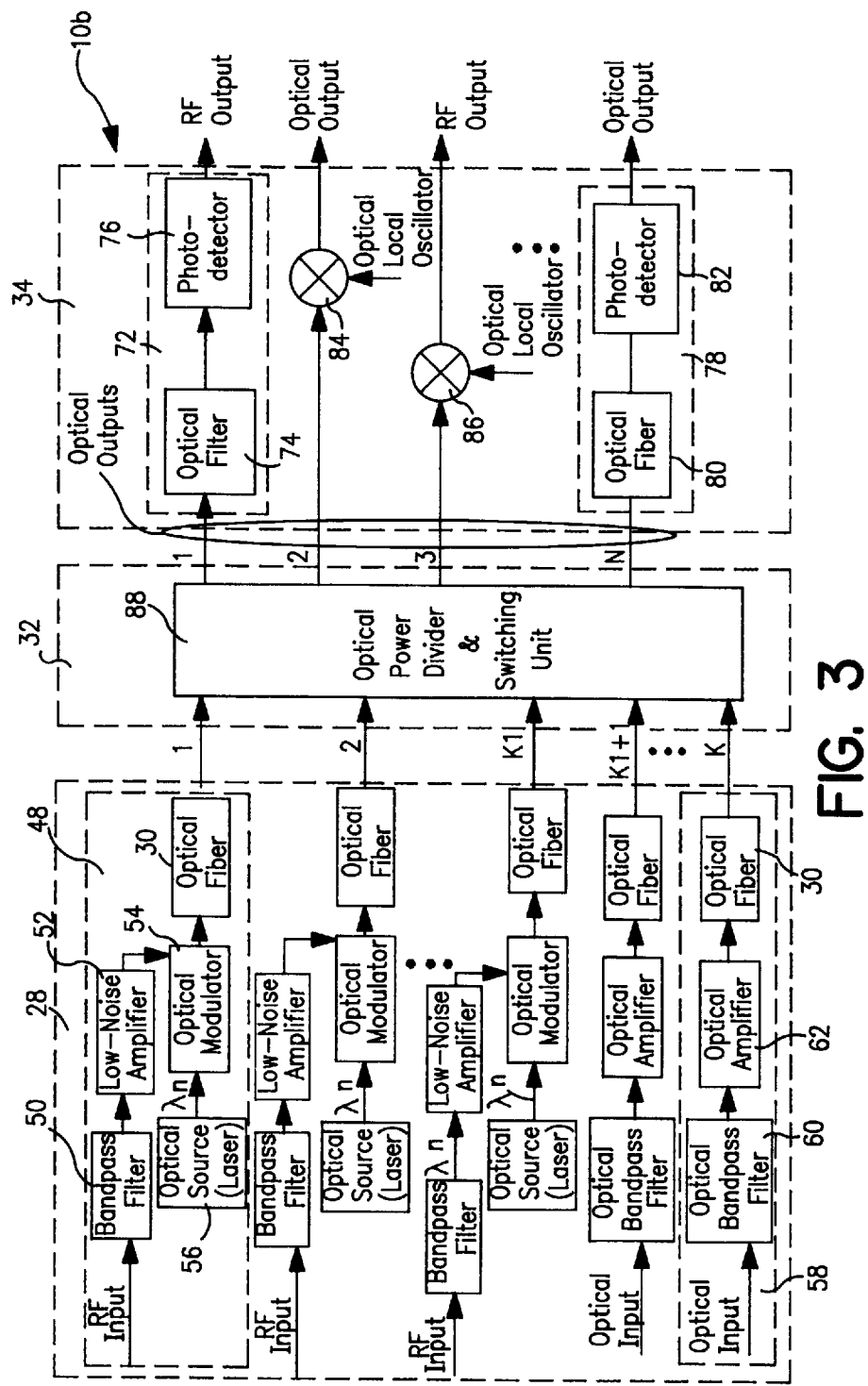
FIG. 3 is a detailed schematic block diagram of another embodiment of the present invention.

Turning to FIG. 3, a second embodiment of the photonic interconnect and photonic processing apparatus 10b is shown. In this regard, like reference numerals will be used to refer to similar elements which have been described in connection with the first embodiment. The photonic interconnect and photonic processing apparatus 10b operates as a single wavelength system which is referred to as a space division multiplex system or a fiber division multiplex system. Here again, the photonic interconnect and photonic processing apparatus 10b includes the optical converter 28, the distribution module 32 and the output module 34 which are each optically coupled with the optical fibers 30. The photonic interconnect and photonic processing apparatus 10b may utilize multi-mode or single-mode fiber optic cables as appropriate.

At each RF input in the RF signal paths 48 of the optical converter 28, the RF signal is bandpass filtered in the bandpass filter 50, amplified with the low-noise amplifier 52, and applied to the optical intensity modulator 54 which receives an optical carrier from the laser 56. The optical intensity modulator 54 varies the instantaneous optical power at the modulator output in proportion to the input RF signal and couples this to the input optical fiber 30. At each optical input in the optical signal path 58, the optical signal is filtered by the optical bandpass filter 60 and amplified by the optical amplifier 62 prior to being coupled to the input optical fiber 30.

The resultant input optical signals from the RF inputs and the optical inputs are applied, via input optical fibers 30, to an optical power divider (splitter) and switching unit 88 of the distribution module 32. The optical power divider and switching unit 88 routes any of the K-input optical signals to any of the optical N-outputs. The key distinguishing feature of the second embodiment is that each single optical fiber 30 carries only a single optical signal having a single wavelength as opposed to a summed or multiplexed optical signal.

Preferably, each optical carrier has the same wavelength. Thus, lasers 56 may all have the same optical wavelength which will also correspond to the wavelength of the optical input signals received by the optical receiving unit 22. However, one skilled in the art would also appreciate that each optical fiber 30 could also have a unique wavelength optical carrier to minimize interferometric ringing. Moreover, a single laser 56 common to all the optical modulators 54 as opposed to individual lasers 56 could also be used. The optical signals passing through the optical power divider and switching unit 88 are again subsequently applied to the output module 34 having the various signal paths as described above.

Figure 4:
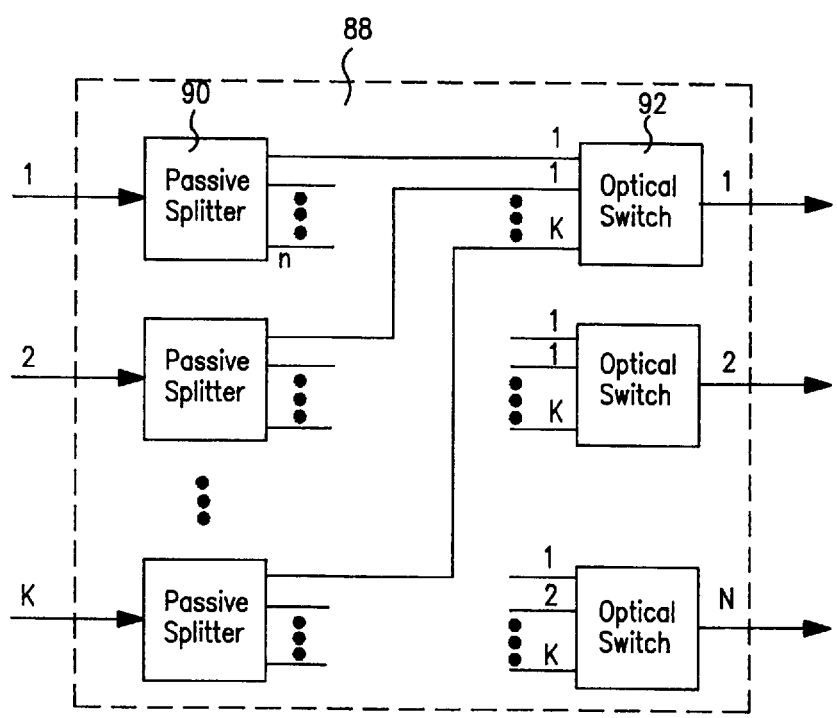
FIG. 4 is a detailed schematic block diagram of an optical power divider and switching unit of FIG. 3.

Referring to FIG. 4, a detailed schematic block diagram of the (K-input)×(N-output) optical power divider and switching unit 88 is shown. The optical power divider and switching unit 88 includes a plurality of passive splitters 90 corresponding to the number of optical K-inputs. Each passive splitter 90 power divides the K-input optical signal and distributes it to each of the N-outputs of the passive splitter 90. The passive splitter 90 may consist of a single K-input, N-output star coupler which is implemented by connecting a single input optical fiber 30 to N-output optical fibers 30. However, other conventional passive splitter techniques could also be utilized.

One output from each passive splitter 90 is applied to each of N-optical switches 92. Each optical switch 92 chooses among the K-inputs by selecting a single desired optical input signal and switching it to the output port. Since there are N(K-input)×(1-output) optical switches 92, the overall optical power divider and switching unit 88 is (K-input)× (N-output), where a single input can be routed to more than one output.

Figure 5:
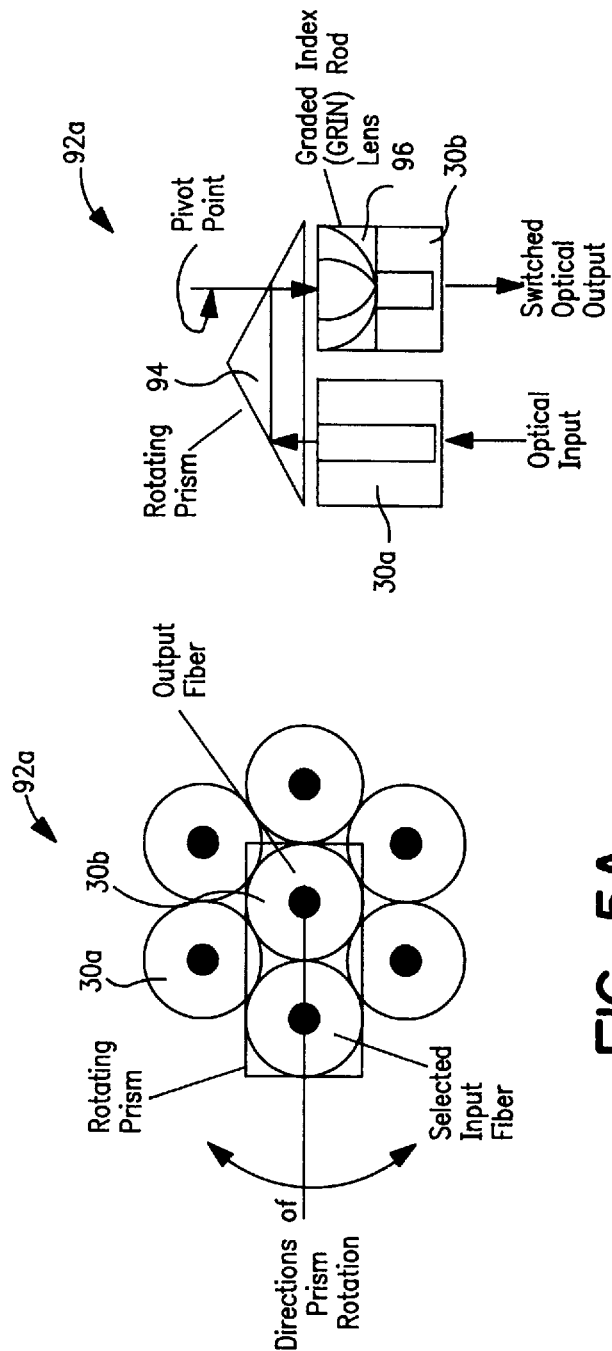
FIGS. 5A and 5B are detailed block diagrams of one embodiment of an optical switch of FIG. 4.

Referring to FIGS. 5A and 5B, an opto-mechanical embodiment of the (K-input)×(1-output) optical switch 92a is shown. For exemplary purposes, the optical switch shown in FIGS. 5A and 5B is a (6-input)×(1-output) optical switch 92a. However, one skilled in the art would readily recognize that any number of K-inputs could be utilized. Each of the K-input optical fibers 30a are arranged in a circle around a central output fiber 30b. A rotating prism 94 is rotated 360° about the central output fiber 30b such that the rotating prism 94 pivots on an axis defined by the longitudinal axis of the central output fiber 30b. As the prism 94 is rotated, the prism 94 passes over each individual input optical fiber 30a. The dimensions of the prism 94 are selected so that as it is rotating, it covers only one input optical fiber 30a at a time. The optical output from the desired input optical fiber 30a is directed by the prism 94 through an internal reflection at two points to the output optical fiber 30b. At the central output fiber 30b, a graded index (GRIN) rod lens 96 is used to focus the output of the prism 94 onto the central output fiber 30b. Control of the opto-mechanical embodiment of the optical switch 92a is by a electrical controller (not shown) which translates a command to select a desired input into a rotational angle for the rotating prism 94.

Figure 6:
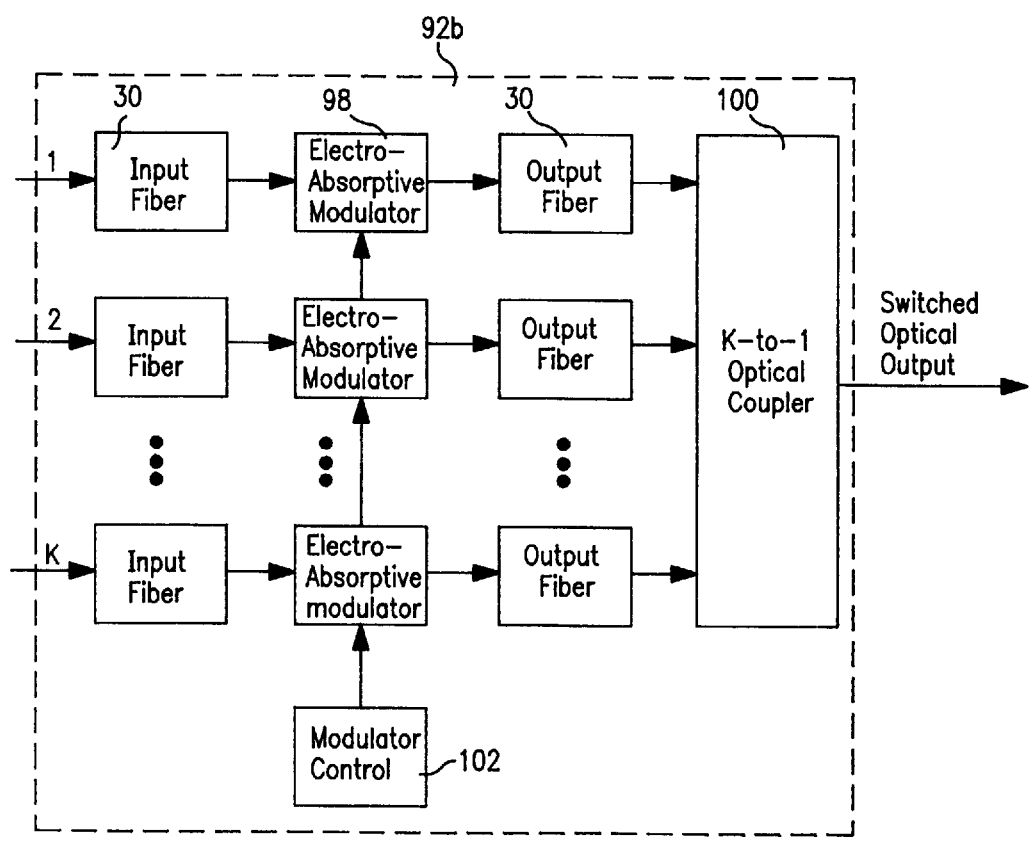
FIG. 6 is a detailed schematic block diagram of another embodiment of the optical switch of FIG. 4.

Referring to FIG. 6, an electro-optical embodiment of the (K-input)×(1-output) optical switch 92b is shown. The optical switch 92b receives the K-input optical signals from the optical fibers 30 and applies the optical signals to K-electro-absorptive modulators 98. The optical signals which pass through the electro-absorptive modulators 98 are coupled to the optical fibers 30 and applied to a K-to-1 optical coupler 100. To select a desired input, an electro-absorptive modulator 98, which is preferably the modulator set forth in U.S. Pat. No. 5,402,259, is commanded by a modulator controller 102 to transmit (i.e. not absorb) an input optical signal from an optical fiber 30, while the remaining electro-absorptive modulators 98 for the other inputs not of interest are commanded to not transmit (i.e. absorb) the optical signal from their corresponding optical fibers 30. By combining all the K electro-absorptive modulator outputs 98 in the optical coupler 100, the single input of interest which has not been absorbed appears at the optical switch 92b output. The modulator controller 102 controls the electro-absorptive modulators 98 by translating commands to select desired "on/off" signals to be applied to the appropriate electro-absorptive modulators 98.

Use of the photonic interconnect and photonic processing apparatus 10 within the satellite 12 significantly reduces the size and weight requirements of the satellite 12, which in turn reduces the overall power requirements of the satellite 12. In addition, with the reduced weight, size and power requirements, the overall launch costs, as well as the costs of the satellite 12 are significantly reduced. Moreover, by converting multiple RF signals received by the satellite 12 into optical signals, bandwidth limitation normally exhibited with satellites utilizing coaxial cables have been eliminated, thereby making the satellite 12 more versatile than conventional satellites.

Figure 7:
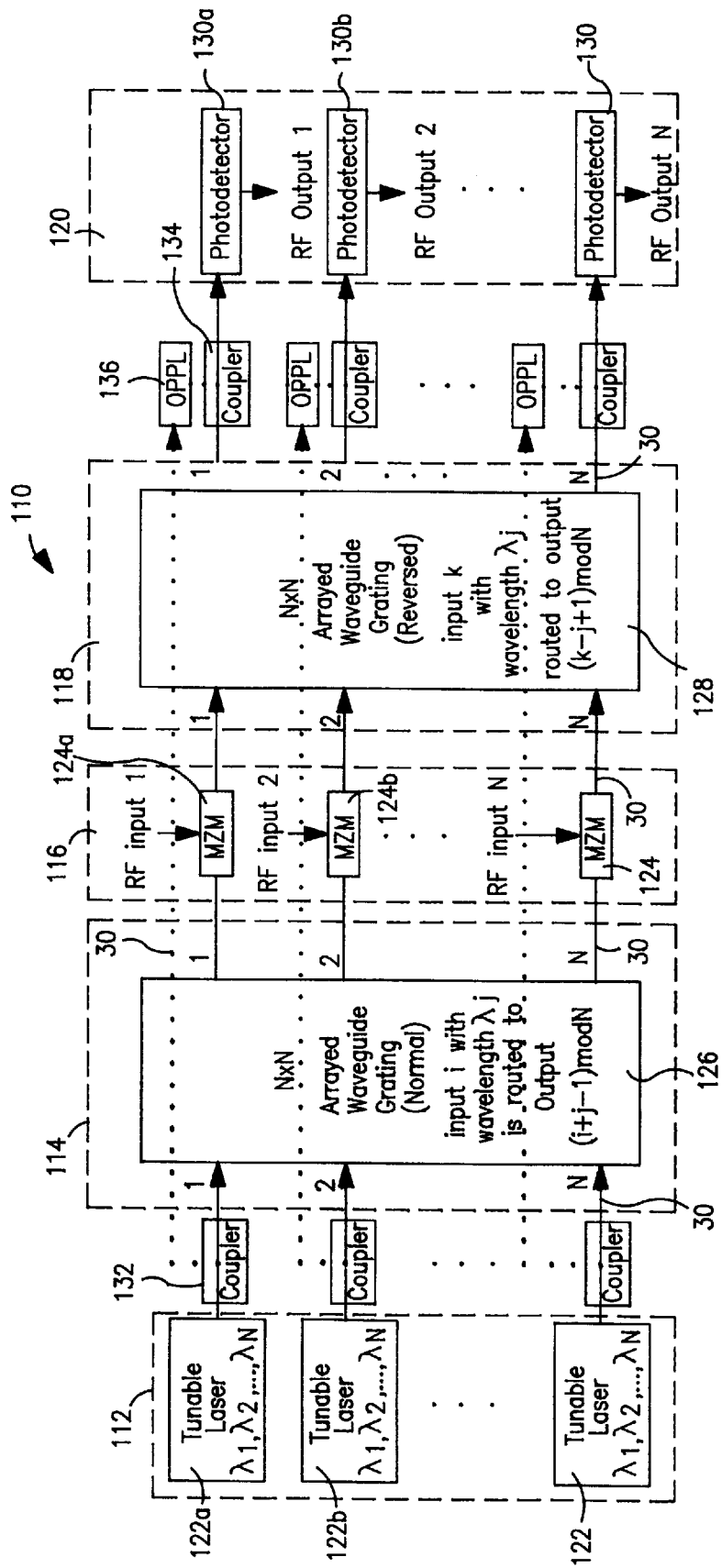
FIG. 7 is a detailed schematic block diagram of a first preferred embodiment of the splitterless optical broadcast switch of the present invention.

Turning to FIG. 7, a detailed schematic block diagram of a first preferred embodiment of a splitterless optical broadcast switch 110 is shown. The splitterless optical broadcast switch 110 may be used in place of the photonic interconnect and photonic processing apparatus 10 in the communication and data handling satellite 12. Alternatively, the splitterless optical broadcast switch 110 may also be employed in terrestrial based applications or systems. The splitterless optical broadcast switch 110 eliminates the use of splitters, such as splitters 70 and 90, which are employed in the distribution module 32 of the photonic interconnect and photonic processing apparatus 10. This further eliminates the need for using optical amplifiers to amplify the optical signal before being split. In order to eliminate the need for the splitters, the splitterless optical broadcast switch 110 pairs each photodetector with a specific laser source, which is another topology for realizing a photonic interconnect 10. To further achieve the broadcast switching feature where any of the N outputs can receive any one of the M inputs independently, two key functions are necessary. First, the optical carriers from the laser sources must be routable to any optical modulator and then back to the photodetector paired with that laser source. Second, the optical modulators employed must be able to modulate multiple optical carriers simultaneously.

In contrast, an N×K wavelength division multiplexed (WDM) switch, such as that shown in FIG. 2, modulates N input signals on N different optical carriers (wavelengths), multiplexes them onto single optical fibers, 1:K power splits the combined signals and then retrieves the desired signal at a photodetector using carrier selection. A K×N single wavelength switch, such as that shown in FIG. 3, uses 1:N splitters followed by K:1 switches. In either architecture, the optical split losses may pose a problem when high dynamic ranges are required. The main difficulty with the above-architectures is that each laser source is permanently connected to a particular optical modulator and RF input instead of with a particular photodetector, as shown in the splitterless optical broadcast switch 110.

The splitterless optical broadcast switch 110 includes an optical source 112, a first stage routing module 114, a modulating module 116, a second stage routing module 118, and an output module 120, each optically coupled together with optical fibers 30. The optical source 112 includes a plurality of tunable lasers 122 which can be tuned to any one of N wavelengths ($\lambda_1, \lambda_2, \ldots, \lambda_n$) where N, the number of wavelengths, corresponds to the number of RF inputs and the number of tunable lasers 122 correspond to the number of RF outputs. The tunable lasers 122 are preferably electrically tunable semiconductor lasers of the distributed feedback type (DBF) which are capable of delivering optical carriers over a broad range of wavelengths. The tunable lasers 122 are electrically tunable and controlled by a conventional programmable controller, and may be included in the control processor 36 of the communication and data handling satellite 10, where independent wavelength addresses are forwarded to each tunable laser 122 to select the desired wavelength.

By tuning the tunable lasers 122 to specific wavelengths, the various unmodulated optical carriers are routed from the optical source 112 to any one of a plurality of desired modulators 124 in the modulating module 116, via the first stage routing module 114. The first stage routing module 114 is an N×N arrayed waveguide grating (AWG) 126 which is used to route the unmodulated optical carriers or carrier signals from the tunable lasers 122 based on their wavelength ($\lambda_1, \lambda_2, \ldots, \lambda_n$) to the plurality of modulators 124 with very little insertion loss. The arrayed waveguide grating 126 has a non-blocking architecture and is cyclic in operation. The arrayed waveguide grating 126 is preferably of the silica waveguide type described in Dragone, et al IEEE Phot. Tech. Lett. 3, 896–899 (1991) and produced by Photonic Integrated Research, Inc. (PIRI) and other commercial suppliers.

By selecting a wavelength $\lambda_j$, the optical carrier at input i to the arrayed waveguide grating 126 is routed to output (i+j−1) mod N of the arrayed waveguide grating 126, where i is the input to the arrayed waveguide grating 126, j is the number of the wavelength, and N is the number of inputs to the arrayed waveguide grating 126. The notation A mod B is defined as the remainder upon division of the integer A by the integer B. For example, assuming there are eight inputs to the arrayed waveguide grating 126 (i.e. N=8), and the tunable laser 122a is tuned to wavelength $\lambda_1$ (i.e. i=1, j=1), we have (1+1−1) mod 8 which equals 1 mod 8. Performing the modular arithmetic you have 1 divided by 8 leaving a remainder of 1. Therefore, $\lambda_1$ from tunable laser 122a will be routed to output port 1 of the arrayed waveguide grating 126. Correspondingly, if tunable laser 122a is tuned to wavelength $\lambda_2$ (i.e. i=1, j=2), the optical carrier having wavelength $\lambda_2$ will be routed to output port 2 (i.e. 1+2−1 mod 8). If tunable laser 122a is tuned to wavelength $\lambda_3$ (i.e. i=1, j=3), optical carrier having wavelength $\lambda_3$ is routed to output port 3 (i.e. 1+3−1 mod 8), and so forth.

Each optical output from the arrayed waveguide grating 126 may be any subset of optical carrier wavelengths to which the tunable lasers 122 can be tuned. These optical carriers are routed from the optical fibers 30 to the various optical modulators 124 in the modulating module 116. The optical modulators 124 are preferably lithium niobate Mach-Zehnder modulators 124 for analog signal transmission, but can be any number of possible modulators for digital signal transmission. The Mach-Zehnder type modulators 124 have substantially no wavelength sensitivity such that if different wavelengths pass through the modulators 124, the RF input signal is modulated onto the unmodulated optical carriers independent of the wavelengths. Each optical modulator 124 is operable to simultaneously modulate its RF input onto any number of optical carriers that are passing through the particular modulator 124 (i.e. 0, $\lambda_1$, $\lambda_2$, etc.).

The modulated optical carrier signals from the optical modulators 124 are applied to the second stage routing module 118, via optical fibers 30. The second stage routing module 118 is also an N×N arrayed waveguide grating (AWG) 128 which functions complimentary to the arrayed waveguide grating 126. Input K is routed to output (K−j+1) mod N. As a net result, an optical carrier from a particular tunable laser 122 which is applied to an input i of arrayed waveguide grating 126 will be routed out of the corresponding or same output i of the arrayed waveguide grating 128.

For example, assuming the arrayed waveguide grating 126 is a 4×4 arrayed waveguide grating 126 and arrayed waveguide grating 128 is also a 4×4 arrayed waveguide grating 128 and that tunable laser 122a is tuned to a wavelength $\lambda_1$ and applied to input 1, we have at the first stage routing module 114:

$$(i + j - 1) \bmod N$$

$$(i + 1 - 1) \bmod 4 = 1$$

Therefore, the optical carrier having wavelength $\lambda_1$ for tunable laser 122a is first routed to output 1 of arrayed waveguide grating 126. Optical carrier $\lambda_1$ is then modulated with RF input 1 and applied to input 1 of arrayed waveguide grating 128. From arrayed waveguide grating 128 you have:

$(k - j + 1) \mod N$ $(1 - 1 + 1) \mod 4 = 1$ such that the modulated optical carrier having wavelength $\lambda_1$ is routed to output 1 of arrayed waveguide grating 128. Accordingly, each input port to arrayed waveguide grating 126 is paired with each output port of arrayed waveguide grating 128, such that each tunable laser 122 is paired with a photodetector 130.

Each of the outputs from arrayed waveguide grating 128 includes a single modulated optical carrier signal at a wavelength the tunable laser 122 at the corresponding input to array waveguide grating 126 is tuned to. These modulated optical carrier signals are then applied to the output module 120. The output module 120 includes the plurality of photodetectors 130 corresponding to the number of outputs. Each photodetector 130 converts a modulated optical carrier signal to an RF signal corresponding to the RF input signal modulated onto the optical carrier. Each photodetector 130 is preferably a semiconductor PIN photo-diode detector 130.

Should coherent detection be desired compared to direct detection, the splitterless optical broadcast switch 110 may also include a first optical coupler 132, a second optical coupler 134 and an optical phase lock loop (OPLL) 136 paired with each pair of tunable lasers 122 and photodetectors 130. The couplers 132 and 134 are preferably fused tapered couplers or directional couplers and the optical phase lock loop 136 is preferably of the type commercially available from Lightwave Electronics, Inc. of Mountain View, Calif. Coherent detection is used for improving sensitivity, RF dynamic range and RF gain. The coherent detection may either be homodyne coherent detection or hetrodyne coherent detection.

In homodyne coherent detection, the first coupler 132 splits off an unmodulated portion of the optical carrier and forwards it to the optical phase lock loop 136, via the optical fiber 30. The optical phase lock loop 136 insures that the phase of the modulated optical carrier signal out of the array waveguide grating 128 is substantially in phase with the unmodulated optical carrier by sensing the phase difference, via coupler 134, and correcting for this phase difference similar to a conventional phase lock loop. The homodyne coherent detection improves the overall dynamic range of the splitterless optical broadcast switch 110.

In hetrodyne coherent detection, the couplers 132 and 134 along with the optical phase lock loop 136 may also be utilized for frequency translation of the RF input signal modulated onto the optical carrier. For example, assuming that the RF input signal is between the range of about 900 MHz to 1000 MHz, and it is desirable to shift the RF input signal down by about 700 MHz, such that the RF signal is now in the range of about 200 MHz to 300 MHz, the RF input signal may be stepped down utilizing the optical phase lock loop 136. Specifically, in hetrodyne coherent detection, the optical phase lock loop 136 will include a second laser which is phase coherent with the tunable laser 122 being used. This second laser is then offset in frequency by a beat tone, such that when the unmodulated optical carrier from the optical phase lock loop 136 is applied to the modulated carrier signal at coupler 134, the RF input signal is stepped down in frequency by about 700 MHz. Alternatively, the RF signal may be stepped up in frequency depending on the wavelength or frequency of the unmodulated carrier coming from the optical phase lock loop 136.

Figure 8:
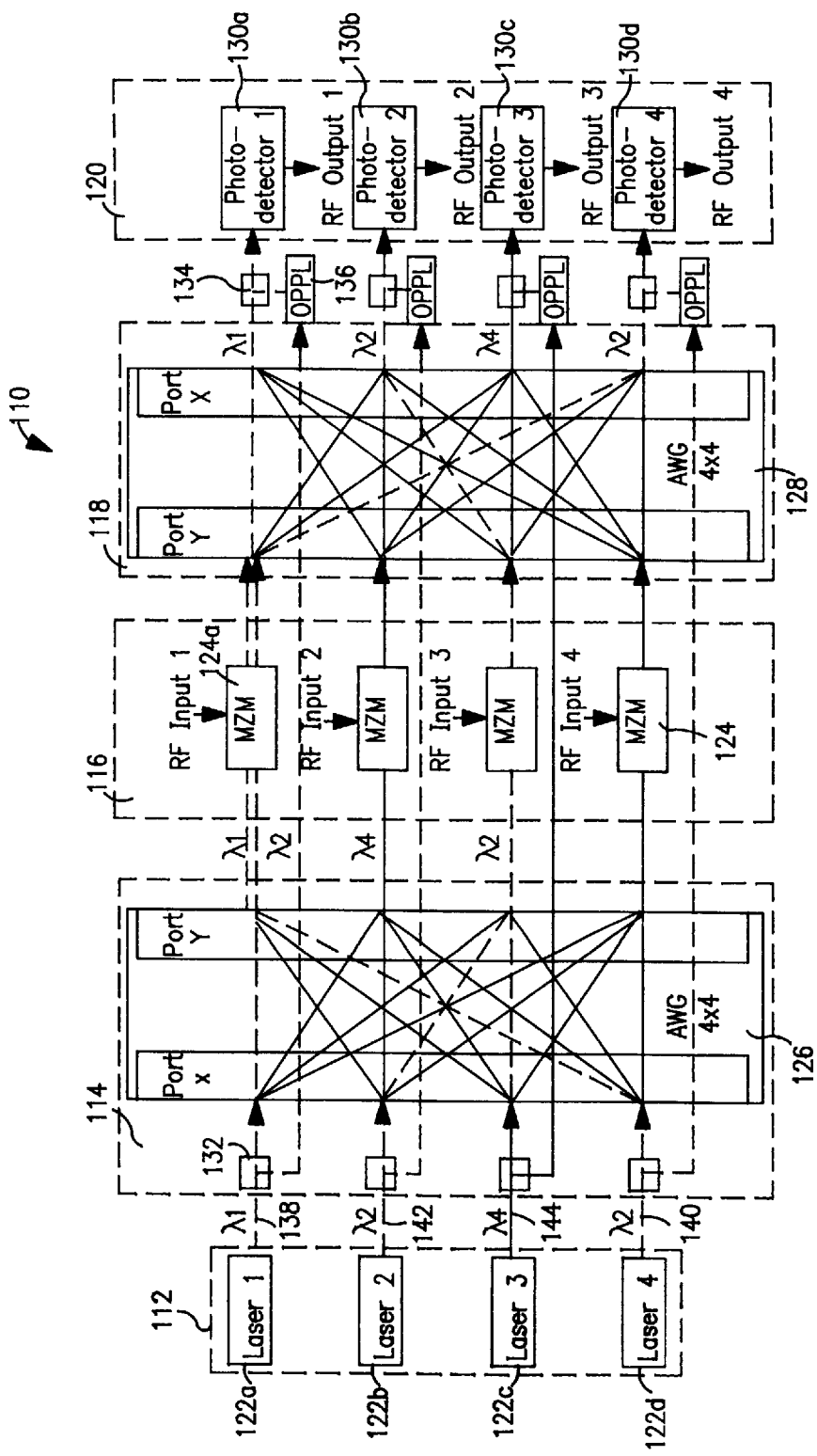
FIG. 8 is an example of a 4×4 switching operation of the optical broadcast switch of FIG. 7.

Referring to FIG. 8, an example for routing various wavelength optical carrier signals in a 4×4 splitterless optical broadcast switch 110 is shown. Sample interconnections are shown in bold lines with: Laser 1 tuned to wavelength $\lambda_1$, so that RF output 1=RF input 1 [(1+1−1)mod4=1]; Laser 2 tuned to wavelength $\lambda_2$ so that RF output 2=RF Input 3 [(2+2−1)mod4=3]; Laser 3 tuned to wavelength $\lambda_4$ so that RF output 3=RF input 2 [(3+4−1)mod4=2]; and Laser 4 tuned to wavelength $\lambda_2$ so that RF output 4=RF input 1 [(4+2−1)mod4=1]; where tuning Laser i to any wavelength $\lambda_j$ always routes RF input (i+j−1)modN to RF output i.

Unmodulated optical carrier 138 having wavelength $\lambda_1$ from laser 1 (122a) is routed through AWG 126 and out output port 1 of AWG 126. Unmodulated optical carrier 140 having wavelength $\lambda_2$ from laser 4 (122d) is also routed out of output port 1 of AWG 126. Both unmodulated optical carriers 138 and 140 are simultaneously modulated with RF input 1 in the optical modulator 124a. The modulated optical carriers 138 and 140 are applied to input port 1 of the AWG 128. Since the AWG 128 is complimentary or a mirror image of the AWG 126, modulated optical carrier signal 138 is routed to output port 1 of AWG 128, while modulated optical carrier signal 140 is routed to output port 4 of the AWG 128. Thus, photodetector 1 (130a) and photodetector 4 (130d) each receive RF input 1. Unmodulated optical carrier 142 having wavelength $\lambda_2$ from laser 2 (122b) is modulated by RF input 3 and routed to the paired photodetector 2 (130b) such that photodetector 2 (130b) receives RF input 3. Unmodulated optical carrier 144 having wavelength $\lambda_4$ from laser 3 (122c) is modulated with RF input 2 and routed to the paired photodetector 3 (130c) such that photodetector 3 (130c) receives RF input 2.

The second preferred embodiment of the splitterless optical broadcast switch 110a of the present invention will now be described with reference to FIGS. 9 and 10. In this regard, like reference numerals will be used to identify similar structures as described with respect to the first preferred embodiment of the present invention. The splitterless optical broadcast switch 110a includes the optical source 112, the first stage routing module 114, the modulating module 116, the second stage routing module 118 and the output module 120, each optically coupled by optical fibers 30. The optical source 112 includes a plurality of fixed wavelength lasers 146 corresponding to the number of N outputs, each set to a different wavelength (i.e. $\lambda_1, \lambda_2, \ldots, \lambda_n$). Here again, the lasers 146 are preferably distributed feedback (DBF) lasers, however, those skilled in the art would recognize that various other lasers may also be utilized.

The first stage routing module 114 includes a plurality of 1 to M switches 148 corresponding to the number of lasers 146 and a plurality of N to 1 wavelength division multiplexers (WDM) 150 corresponding to the number of modulators 124. Each 1 to M switch 148 is preferably a lithium niobate electro-optical spatial switch 148. Each 1 to M spatial switch 148 switches its single input to only one of M outputs versus a splitter which splits the single input into multiple outputs by power dividing the signal. Each wavelength division multiplexer 150 is preferably a grating based N to 1 combiner which can receive multiple optical carriers simultaneously and transfer the multiple optical carriers to a single output with low loss. For example, 1 to M switch 148a and 1 to M switch 148b can each be switched to its corresponding first output port such that unmodulated optical carrier having wavelength $\lambda_1$ from laser 146a and unmodulated optical carrier having wavelength $\lambda_2$ from laser 146b are both simultaneously applied to wavelength division multiplexer (WDM) 150a.

The unmodulated optical carriers from the first stage routing module 114 are applied to the modulating module 116, via optical fibers 30. Each Mach-Zehnder modulator 124 is operable to simultaneously modulate each optical carrier routed to it with its corresponding RF input signal (i.e. any number of optical carriers routed to it). The modulated optical carrier signals from the modulators 124 are then applied to the second stage routing module 118.

The second stage routing module 118 includes a plurality of 1 to N wavelength division multiplexers (WDM) 152 and a corresponding number of M to 1 spatial switches 154. Here again, the second stage routing module 118 is complimentary to the first stage routing module 114 such that the M to 1 switches 154 are set complimentary to the 1 to M switches 148 and the wavelength division multiplexers 150 and 152 are fabricated as complimentary components.

Accordingly, assuming that an unmodulated optical carrier having fixed wavelength $\lambda_1$ from laser 146a and an unmodulated optical carrier having wavelength $\lambda_2$ from laser 146b are modulated with RF input 1 by modulator 124a, and applied to wavelength division multiplexer 152a, wavelength division multiplexer 152a applies the modulated optical carrier signal having wavelength $\lambda_1$ to M to 1 switch 154a and modulated optical carrier signal having wavelength $\lambda_2$ to M to 1 switch 154b. M to 1 switch 154a is set to receive input 1 and M to 1 switch 154b is also set receive input 1 complimentary to the output of switches 148a and 148b, such that RF output 1 from photodetector 130a and RF output 2 from photodetector 130b deliver RF input 1.

Switches 148 and switches 154 are employed to perform the routing function of splitterless optical broadcast switch 110a, in contrast to laser tuning or wavelength tuning performed with splitterless optical broadcast switch 110 of the first preferred embodiment. Additionally, the splitterless optical broadcast switch 110a may also include the first coupler 132, the second coupler 134, and the optical phase lock loop 136 should homodyne or hetrodyne coherent detection be desired, similar to the first preferred embodiment.

Figure 10:
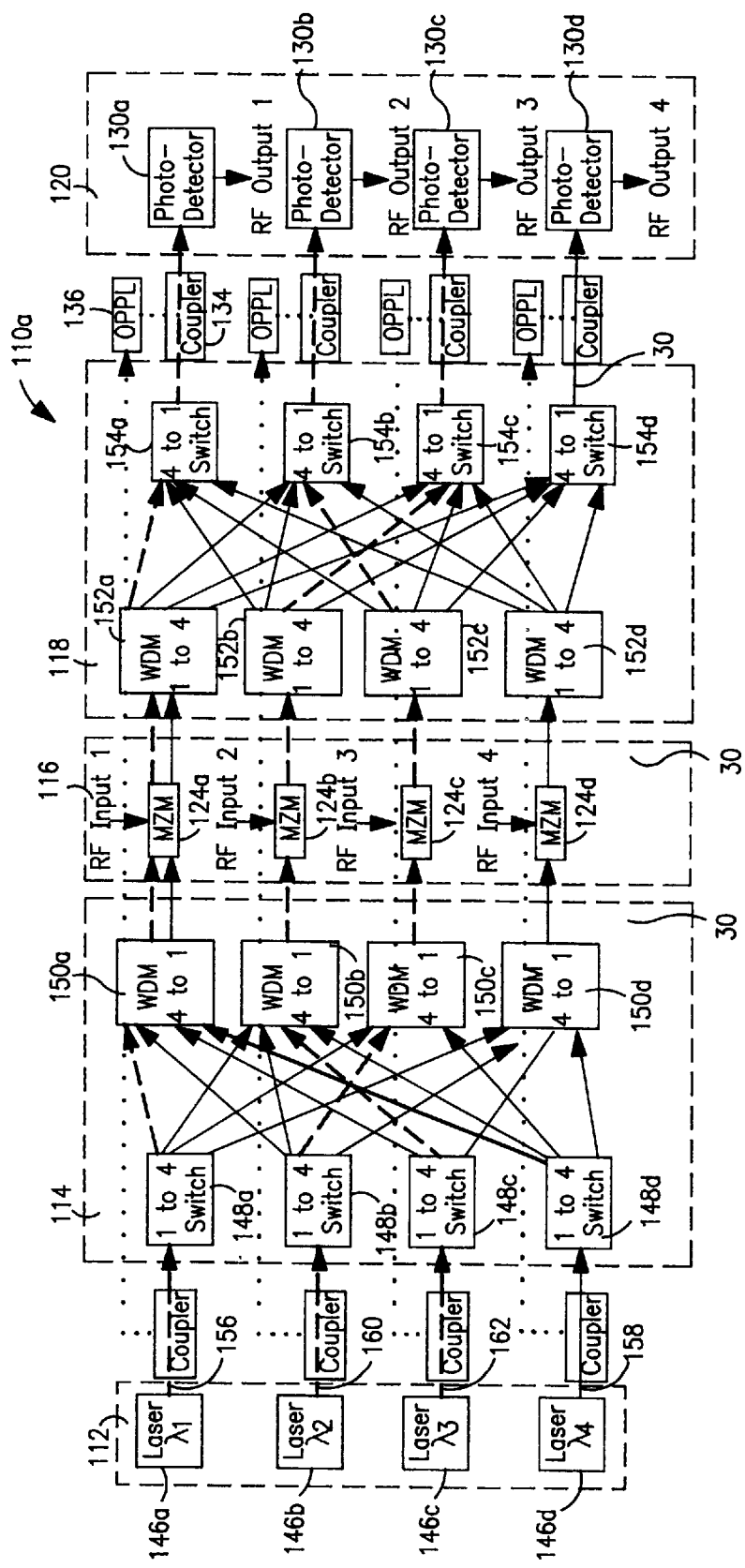
FIG. 10 is an example of a 4×4 switching operation of the optical broadcast switch of FIG. 9.

Turning to FIG. 10, an example for routing optical carriers in a 4×4 splitterless optical broadcast switch 110a is shown. The sample interconnections are shown in bold lines with:
switches associated with laser 1 and photodetector 1 set to first setting to connect RF input 1 to RF output 1;
switches associated with laser 2 and photodetector 2 set to third setting to connect RF input 3 to RF output 2;
switches associated with laser 3 and photodetector 3 set to second setting to connect RF input 2 to RF output 3;
and switches associated with laser 4 and photodetector 4 set to first setting to connect RF input 1 to RF output 4; where RF output i selects RF input k by setting the switches associated with laser/photodetector i to their kth setting.

Specifically, should RF output 1 wish to receive the RF input 1 and RF output 4 also wish to receive RF input 1, 1 to 4 switch 148a is set to output port 1 and 1 to 4 switch 148d is set to output port 1, such that unmodulated optical carrier 156 from laser 146a having wavelength $\lambda_1$ and unmodulated optical carrier 158 from laser 146d having wavelength $\lambda_4$ are both applied to WDM 150a. Unmodulated optical carrier 156 and unmodulated optical carrier 158 are each simultaneously modulated with RF input 1 and routed to complimentary WDM 152a and through 1 to 4 switch 154a and 1 to 4 switch 154d such that RF output 1 of photodetector 130a and RF output 4 of photodetector 130d each deliver RF input 1. Should RF output 2 wish to receive RF input 3, 1 to 4 switch 148b is set to output port 3 and unmodulated optical carrier 160 having wavelength $\lambda_2$ from laser 146b is supplied to WDM 150c, modulated with RF input 3, and returned to 4 to 1 switch 154b, via WDM 152c. Should RF output 3 wish to receive RF input 2, 1 to 4 switch 148c is set to output port 2 and unmodulated optical carrier 162 having wavelength $\lambda_3$ from laser 146c is applied to WDM 150b, modulated with RF input 2 and applied to 4 to 1 switch 154c, via WDM 152b.

A third preferred embodiment of the present invention will now be described with reference to FIGS. 11–12. In this regard, like reference numerals will be used to identify similar structures as described with respect to the first and second preferred embodiments of the present invention. The splitterless optical broadcast switch 110b also includes the optical source 112, the first stage routing module 114, the modulating module 116, the second stage routing module 118, and the output module 120, each optically coupled together, via optical fibers 30. The splitterless optical broadcast switch 110b is essentially a hybrid of the first and second preferred embodiments in that it employs both optical switches and arrayed waveguide gratings. The optical source 112 includes a plurality of tunable lasers 164 corresponding to the number of N outputs. The tunable lasers 164 are similar to the tunable lasers 122, except that the tunable lasers 164 only tune over a fixed number of wavelengths $\lambda_j$, less than the number of RF inputs M. Each tunable laser therefore only tunes to a subset of wavelengths that the entire optical source 112 may tune to.

The first stage routing module 114 includes a plurality of 1 to M/J switches 166 and a plurality of N×N arrayed waveguide gratings (AWG) 168, where M corresponds to the number of RF inputs, J corresponds to the number of wavelengths a single tunable laser 164 can tune to, and N corresponds to the number of outputs. The number of 1 to M/J switches 166 also corresponds to the number of tunable lasers 164; M/J corresponds to the number of N×N arrayed waveguide gratings.

The modulating module 116 includes a separate modulator 124 for each RF input M. The modulators 124, are grouped in subsets corresponding to the number of wavelengths each tunable laser 164 may tune to. In other words, assuming the tunable laser 164 can tune to four wavelengths, there will correspondingly be four modulators 124 associated with a single first stage arrayed waveguide grating 168.

Here again, the second stage routing module 118 is also complimentary to the first stage routing module 114. The second stage routing module 118 includes a plurality N×N arrayed waveguide gratings (AWG) 170 and a plurality of M/J to 1 switches 172. The output from the second stage routing module 118 is again applied to the output module 120 having photodetectors 130, via optical fibers 30. The splitterless optical broadcast switch 110b operates by both selecting the particular wavelength and by setting the position of the switches 166 and 172. In other words, RF output i selects RF input k by a combination of tuning the wavelength of laser i and adjusting the switches associated with laser/photodetector i. The group of modulators to which any laser's unmodulated output is routed is determined by the setting of the 1 to M/J Switch corresponding to that laser. The individual modulator selected within that group is determined by the wavelength the laser is tuned to. In addition, the optical broadcast switch 110b may also employ couplers 132 and 134 and optical phase lock loop 136, similar to the first and second preferred embodiments.

Figure 12:
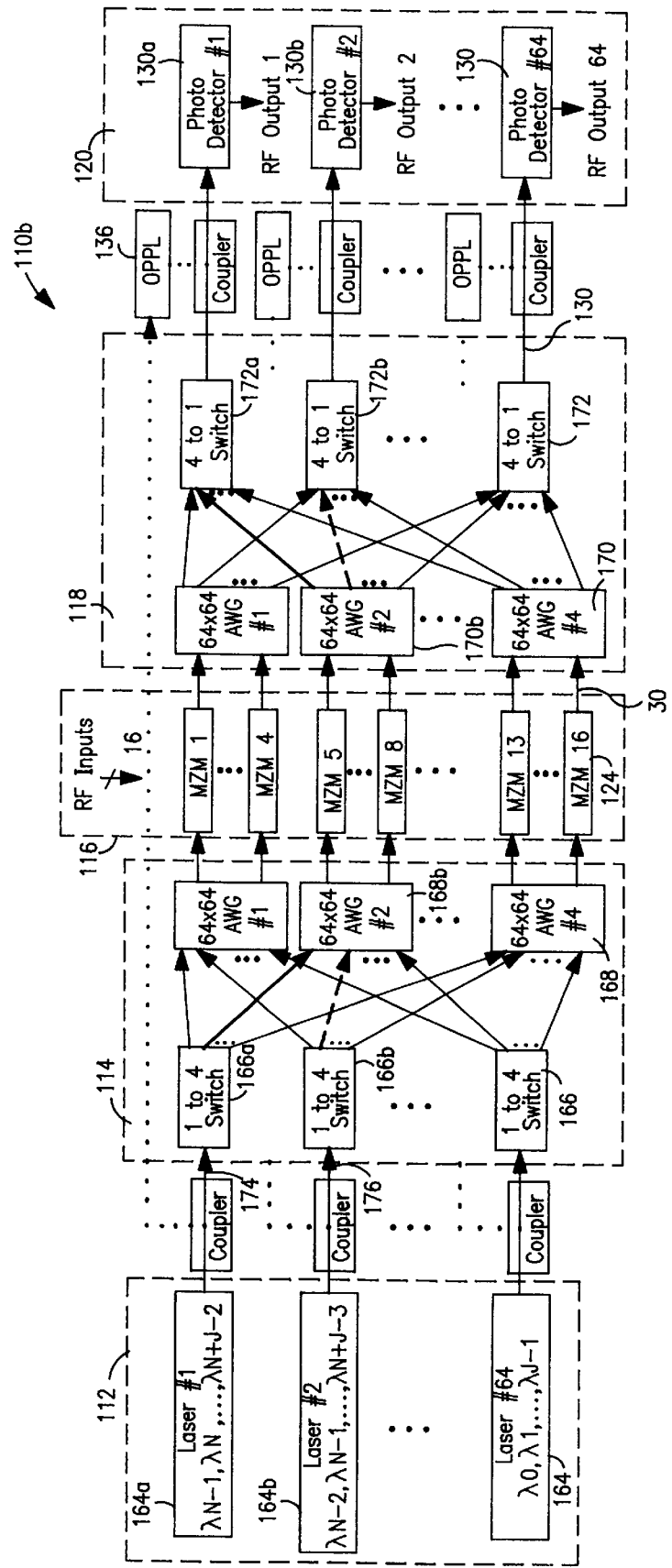
FIG. 12 is an example of a 16×64 switching operation of the splitterless optical broadcast switch of FIG. 11.

A routing example for a 16×64 hybrid splitterless optical broadcast switch 110b is shown in FIG. 12. First, assume RF output 1 wishes to receive RF input 5, since RF input 5 is applied to modulator 5 in the second set of four modulators 124 corresponding to the second pair of AWGs 168b and 170*b*, 1 to 4 switch 166*a* is set to output port 2 and 4 to 1 switch 172*a* is set to input port 2. Since modulator 5 is the first modulator in the subset, wavelength $\lambda_{64}$ or the first wavelength of laser 1 (164*a*) is selected such that first stage AWG 2 (168*b*) routes unmodulated optical carrier 174 to modulator 5, second stage AWG 2 (170*b*) routes the modulated optical carrier signal 174 to 4 to 1 switch 172*a* such that RF output 1 delivers RF input 5.

Should RF output 2 wish to receive RF input 8, RF input 8 is modulated in modulator 8 which corresponds to the last modulator in the modulator subset between first stage AWG 2 (168*b*) and second stage AWG 2 (170*b*). As such, 1 to 4 switch 166*b* is set to its output port 2 and 4 to 1 switch 172*b* is set to its input port 2 to route optical carrier signal 176 to the second pair of AWGs 168*b* and 170*b*. To route the optical carrier 176 to modulator 8, laser 2 (164*b*) is tuned to wavelength $\lambda_{66}$ or the fourth wavelength such that first stage AWG 2 (168*b*) routes optical carrier 176 to modulator 8. The modulated optical carrier signal 176 is then supplied to second stage AWG 2 (170*b*), routed to 4 to 1 switch 172*b* and to photodetector 130*b*. RF output 2 thus delivers RF input 8.

Figure 9:
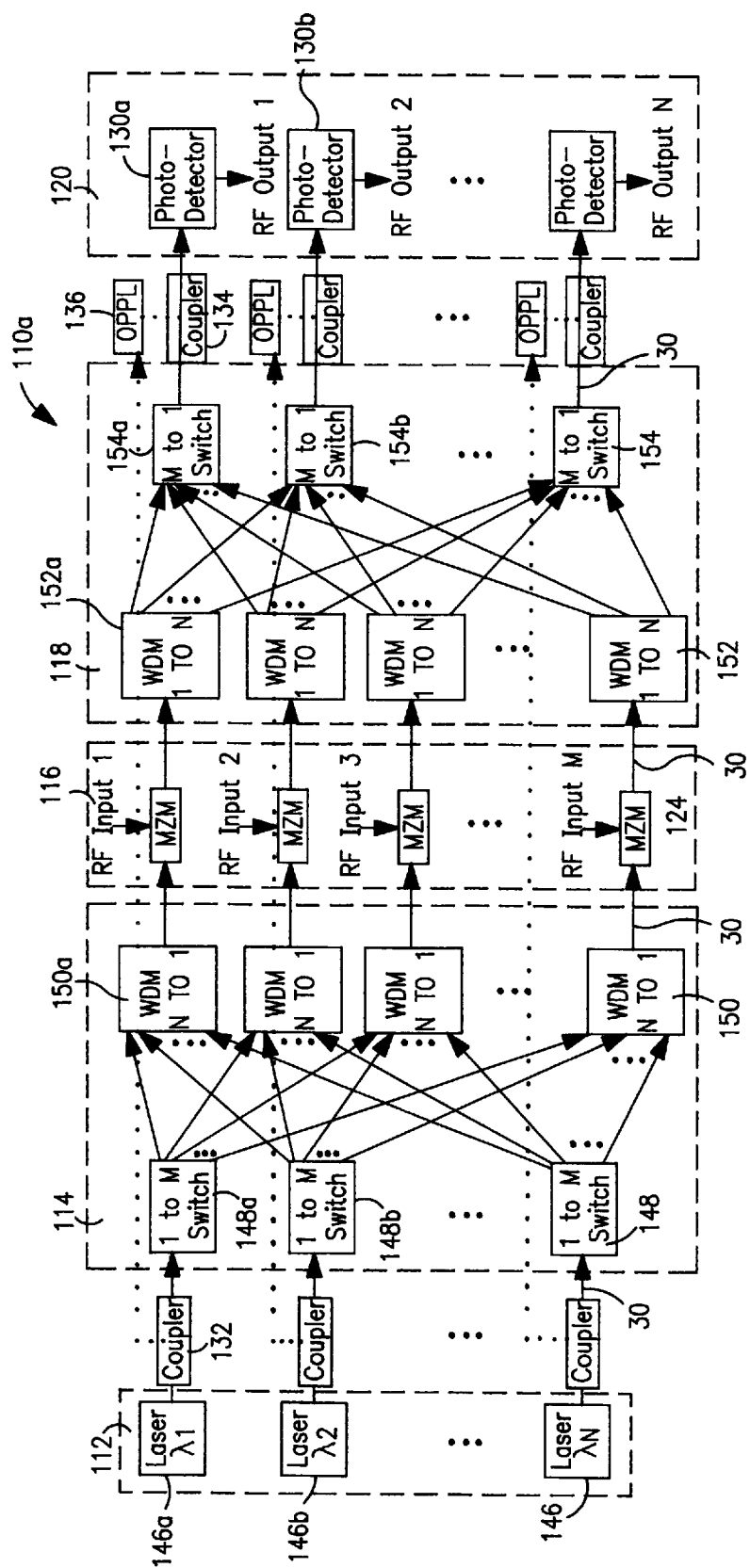
FIG. 9 is a detailed schematic block diagram of a second preferred embodiment of the optical broadcast switch of the present invention.
Figure 11:
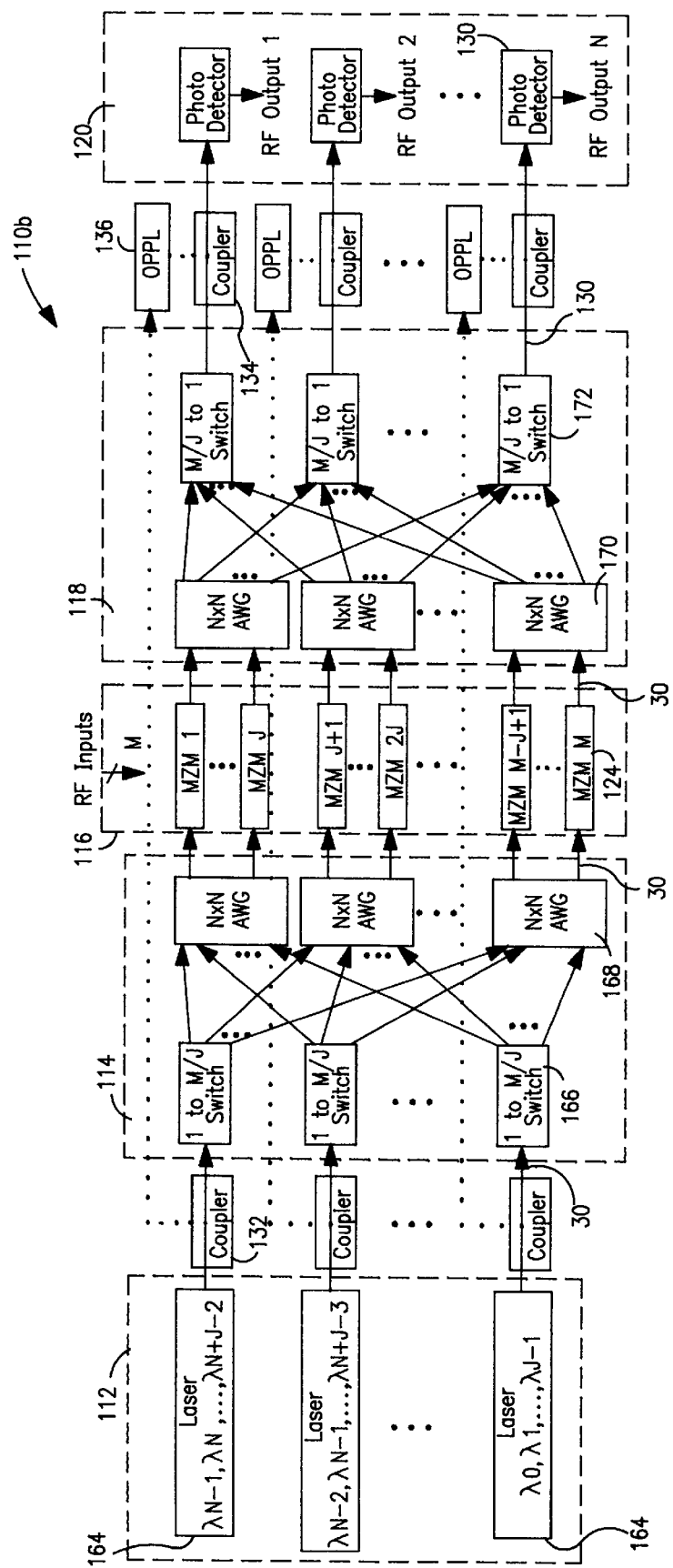
FIG. 11 is a detailed schematic block diagram of a third preferred embodiment of the optical broadcast switch of the present invention.

Referring to FIG. 13, a chart setting forth the configuration requirements for the first, second and third embodiments set forth in FIGS. 7, 9 and 11, respectively, are detailed for a 16×64 splitterless optical broadcast switch 110. The chart sets forth the number of modulators, detectors, lasers, 1:K and K:1 switches, AWGs or WDMS, as well as the wavelength requirements and the number of I/O ports used by the AWGs or WDMs. Upon review of the chart, one can select the appropriate embodiment for its particular requirement based on size, power and cost limitations. For example, FIG. 7 requires a laser 122 which can tune to 16 wavelengths, whereas FIG. 11 requires a laser 164 which only tunes to four wavelengths, whereas FIG. 9 requires only a single wavelength from each laser 146. However, FIGS. 9 and 11 also require 64 switches, whereas as FIG. 7 requires none.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A splitterless optical broadcast switch for routing a plurality of optical carrier signals, said splitterless optical broadcast switch comprising:

an optical source operable to generate a plurality of unmodulated optical carrier signals;

a first stage routing module optically coupled to said optical source, said first stage routing module operable to route said plurality of unmodulated optical carrier signals;

a modulating module optically coupled to said first stage routing module, said modulating module operable to receive a plurality of RF input signals and operable to modulate each of said RF input signals received onto any number of said unmodulated optical carrier signals to generate a plurality of modulated optical carrier signals;

a second stage routing module optically coupled to said modulating module, said second stage routing module operable to route said plurality of modulated optical carrier signals complimentary to said first stage routing module; and an output module operable to receive said plurality of modulated optical carrier signals, wherein each optical output from said optical source is paired to a complimentary optical input of said output module.

2. The splitterless optical broadcast switch as defined in claim 1 wherein said optical source includes a plurality of lasers and said output module includes a plurality of photodetectors, wherein each of said lasers is paired with one of said photodetectors.

3. The splitterless optical broadcast switch as defined in claim 1 wherein said modulating module includes a plurality of modulators, each of said modulators operable to simultaneously modulate any number of unmodulated optical carrier signals.

4. The splitterless optical broadcast switch as defined in claim 1 wherein said first stage routing module includes a first arrayed waveguide grating and said second stage routing module includes a second arrayed waveguide grating, wherein said second arrayed waveguide grating routes optical carrier signals complimentary to said first arrayed waveguide grating.

5. The splitterless optical broadcast switch as defined in claim 1 wherein said first stage routing module includes a plurality of spatial switches and a plurality of waveguide division multiplexers and said second stage routing module includes a plurality of wavelength division multiplexers and a plurality of spatial switches.

6. The splitterless optical broadcast switch as defined in claim 1 wherein said first stage routing module includes a plurality of spatial switches and a plurality of arrayed waveguide gratings and said second stage routing module includes a plurality of arrayed waveguide gratings and a plurality of spatial switches.

7. A splitterless optical broadcast switch for routing a plurality of optical carrier signals, said splitterless optical broadcast switch comprising:

a plurality of lasers, each of said lasers operable to generate an unmodulated optical carrier signal;

a first stage routing module optically coupled to said plurality of lasers, said first stage routing module operable to route each unmodulated optical carrier signal generated by said plurality of lasers;

a plurality of modulators, each of said modulators optically coupled to said first stage routing module and coupled to an RF input, each of said modulators operable to modulate each unmodulated optical carrier signal routed to it by said first stage routing module with an RF input signal to generate a plurality of modulated optical carrier signals;

a second stage routing module optically coupled to said plurality of modulators, said second stage routing module operable to route each of said modulated optical carrier signals generated by said plurality of modulators; and a plurality of photodetectors, each of said photodetectors optically coupled to said second stage routing module, each of said photodetectors operable to receive a modulated optical carrier signal routed to it from said second stage routing module, wherein each of said photodetectors is paired with one of said lasers to receive said optical carrier signal from said laser.

8. The splitterless optical broadcast switch as defined in claim 7 wherein each of said modulators is operable to simultaneously modulate multiple unmodulated optical carrier signals routed to it by said first stage routing module with an RF input signal.

9. The splitterless optical broadcast switch as defined in claim 7 wherein each of said lasers is a tunable laser operable to be tuned to generate a plurality of unmodulated optical carrier signals each having a different wavelength.

10. The splitterless optical broadcast switch as defined in claim 7 wherein each of said photodetectors paired with one of said lasers includes a first optical coupler, an optical phase lock loop and a second optical coupler which are operable to provide coherent detection.

11. A splitterless optical broadcast switch for routing a plurality of optical carrier signals, said splitterless optical broadcast switch comprising:

optical means for generating a plurality of unmodulated optical carrier signals;

first stage routing means for routing said plurality of unmodulated optical carrier signals;

modulating means for receiving a plurality of RF input signals and for modulating each of said RF input signals with any number of said unmodulated optical carrier signals to generate a plurality of modulated optical carrier signals;

second stage routing means for routing said plurality of modulated optical carrier signals complimentary to said first stage routing means; and output means for receiving said plurality of modulated optical carrier signals, wherein said output means is paired with said optical means.

12. The splitterless optical broadcast switch as defined in claim 11 wherein said optical means includes a plurality of lasers and said output means includes a plurality of photodetectors, wherein each of said lasers is paired with one of said photodetectors.

13. The splitterless optical broadcast switch as defined in claim 11 wherein said modulator means includes a plurality of modulators, each of said modulators operable to simultaneously modulate multiple unmodulated optical carrier signals with an RF input signal.

14. The splitterless optical broadcast switch as defined in claim 11 wherein said first stage routing means includes an N×N array waveguide grating and said second stage routing means includes an N×N array waveguide grating.

15. The splitterless optical broadcast switch as defined in claim 11 wherein said first stage routing means includes a plurality of spatial switches and said second stage routing means includes a plurality of spatial switches.

16. A splitterless optical broadcast switch for routing a plurality of optical carrier signals, said splitterless optical broadcast switch comprising:

a plurality of lasers, each of said lasers paired with a photodetector, each of said photodetectors operable to receive an optical carrier signal generated by said laser paired with said photodetector;

a plurality of modulators, each of said modulators operable to simultaneously modulate multiple optical carrier signals with an RF input signal;

a first stage routing module operable to route each of said optical carrier signals generated by said plurality of lasers to any of said plurality of modulators; and a second stage routing module operable to route each of said optical carrier signals modulated by said plurality of modulators.

17. The splitterless optical broadcast switch as defined in claim 16 wherein said splitterless optical broadcast switch is employed in a communication and data handling satellite.

18. The splitterless optical broadcast switch as defined in claim 16 wherein the routing of said second stage routing module is complimentary to the routing of said first stage routing module.

19. The splitterless optical broadcast switch as defined in claim 16 wherein a subset of said plurality of modulators is paired with a first stage arrayed waveguide grating in said first stage routing module and a second arrayed waveguide grating in said second stage routing module.

20. A method for routing an optical carrier signal in a splitterless optical broadcast switch, said method comprising the steps of:

generating a first optical carrier signal;

routing said first optical carrier signal from a first input in a first stage routing module to any of a plurality of optical modulators;

modulating said first optical carrier signal with an RF input signal using one of said optical modulators; and routing said first optical carrier signal modulated with said RF input signal in a second stage routing module to a first output complimentary to said first input of said first stage routing module.

21. The method as defined in claim 20 further comprising the steps of:

generating a second optical carrier signal;

routing said second optical carrier signal from a second input in said first stage routing module to any of said plurality of optical modulators;

simultaneously modulating said first optical carrier signal and said second optical carrier signal with an RF input signal using one of said optical modulators; and routing said first optical carrier signal modulated with said RF input signal in said second stage routing module to said first output complimentary to said first input of said first stage routing module and routing said second optical carrier signal modulated with said RF input signal in said second stage routing module to a second output complimentary to said second input of said first stage routing module.

* * * * *